United States Patent [19]

Tanaka et al.

[11] Patent Number: 5,339,314
[45] Date of Patent: Aug. 16, 1994

[54] PACKET DATA TRANSMISSION UNIT HAVING OCCUPIED, IDLE, AND RELEASED STATES THEREFOR

[75] Inventors: Tsutomu Tanaka, Nishinomiya; Hiroshi Yokota, Osaka, both of Japan

[73] Assignee: Matsushita Electric Industrial Co., Ltd., Osaka, Japan

[21] Appl. No.: 882,608

[22] Filed: May 13, 1992

[30] Foreign Application Priority Data

May 14, 1991 [JP] Japan .................. 3-107802

[51] Int. Cl.⁵ .............................. H04J 1/16
[52] U.S. Cl. .................. 370/13; 370/85.7; 370/85.15; 340/825.05
[58] Field of Search .............. 370/60, 94.1, 85.1, 370/85.15, 85.4, 85.7, 85.2, 85.6, 95.1, 85.12, 85.9, 13, 15, 16, 95.3, 111; 340/825.05, 825.50, 825.51, 825.07

[56] References Cited

U.S. PATENT DOCUMENTS

| | | | |
|---|---|---|---|
| 4,704,714 | 11/1987 | Tomizawa | 370/15 |
| 4,970,720 | 11/1990 | Esaki | 370/94.1 |
| 5,014,265 | 5/1991 | Hahne et al. | 370/60 |
| 5,038,347 | 8/1991 | Courtois | 370/85.1 |
| 5,051,742 | 9/1991 | Hullet et al. | 370/94.1 |
| 5,132,964 | 7/1992 | Esaki | 370/94.1 |
| 5,163,046 | 9/1992 | Hahne et al. | 370/60 |

OTHER PUBLICATIONS

Communication Systems Research Laboratory, Matsushita Electric Industrial Co., Ltd., Mar. 27, 1992.
A Study on Priority Control Mechanism of ATMR in Multiservice Environment by Takashi Ito et al. NTT Communication Switching Laboratories.
A Study on the Architecture of a High-Speed Ring Network by Takashi Ito et al. NTT Communication Switching Laboratories.

*Primary Examiner*—Douglas W. Olms
*Assistant Examiner*—Chau T. Nguyen
*Attorney, Agent, or Firm*—Price, Gess & Ubell

[57] ABSTRACT

A data transmission unit for use in a system wherein data to be transmitted is organized into packets which are assigned one of three states: idle, occupied, or released, and transmitted among interconnected units. Each unit is assigned a window limit on the number of packets it may transmit and has one or more terminals associated therewith, which may or may not have data to transmit. The unit responds to the state of a received packet, the state of the window limit, and the presence or absence of transmit data to control whether the packet transmitted out of the unit is a packet from an internal switching buffer, a released packet from a released cell producing circuit, an occupied packet containing data from the unit's own terminals, or a dummy cell. A released packet contains the address of the unit which generated it and is generated when there is no data to be transmitted and an idle cell is received by the unit. Any unit other than the generating unit can occupy a released packet with data from its terminal, even though its allocated window is exhausted, thereby increasing data throughput.

23 Claims, 14 Drawing Sheets

Fig. 8

| State of received cells | Destination | Cell receiving unit | Shifted by cell shifting unit | Windows | Length of queue | Cell sender | Remaining band | Remaining queue | Cell to be transmitted |
|---|---|---|---|---|---|---|---|---|---|
| occupied | another node | | occupied | W>0 | Q>0 | | W | Q | occupied |
| | | | | | Q=0 | | | | |
| | | | | W=0 | Q>0 | | | | |
| | | | | | Q=0 | cell shifting unit | | | |
| | self-node | O | | | | | | | |
| idle | self-node | | idle | W>0 | Q>0 | cell transmitting unit | W-1 | Q-1 | occupied |
| | | | | | Q=0 | | | 0 | released self-node |
| | another node | | | W=0 | Q>0 | | 0 | Q | idle |
| | | | | | Q=0 | | | 0 | |
| released | self-node | | | | | cell shifting unit | | | |
| | another node | | released | W>0 | Q>0 | cell transmitting unit | W | Q-1 | occupied |
| | | | | W=0 | | | 0 | | |
| | | | | W>0 | Q=0 | | W | 0 | released |
| | | | | W=0 | | cell shifting unit | 0 | | |

O: receive

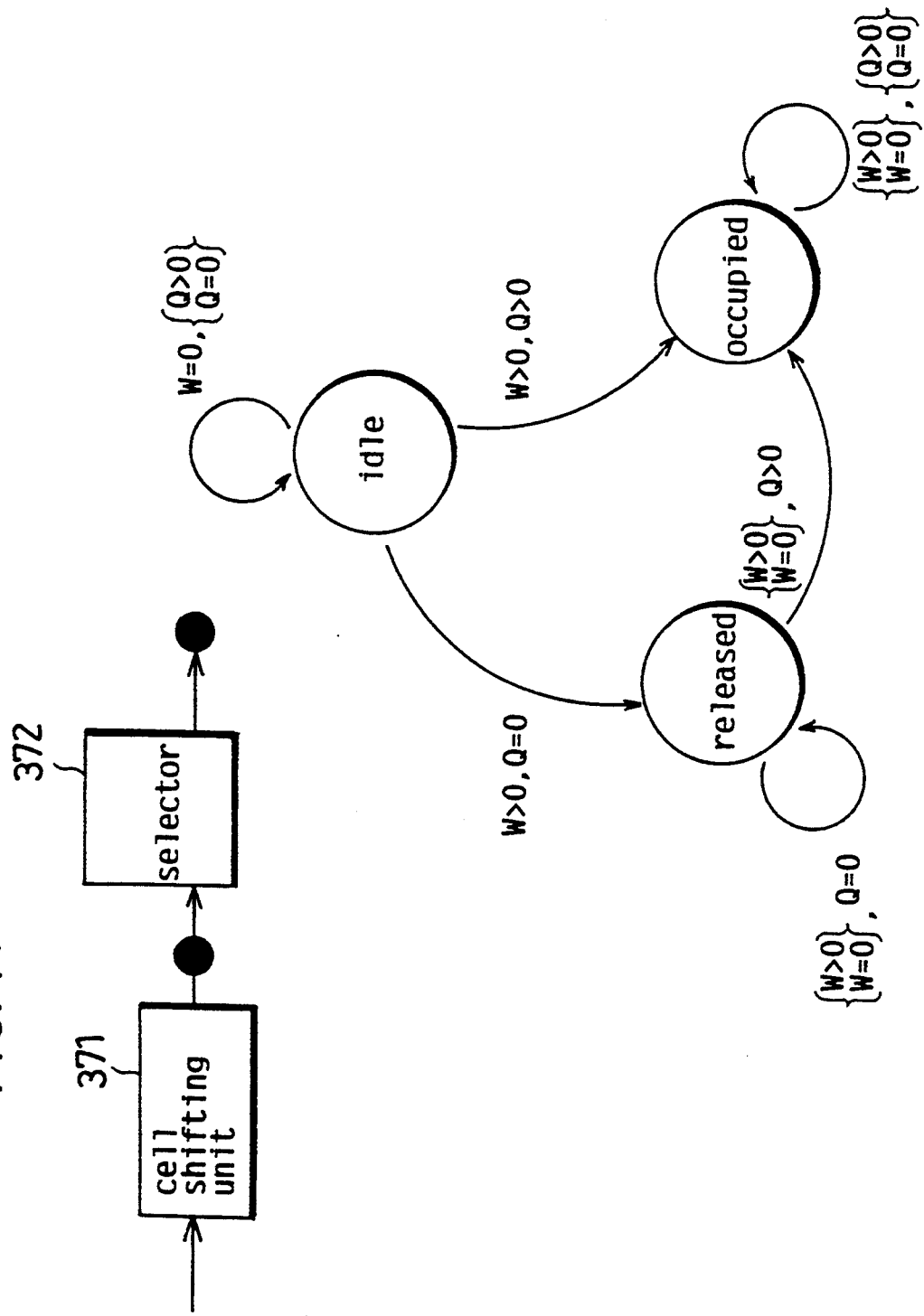

Fig. 12

○: receive

| State of received cells | Destination | Cell receiving unit | Shifted by cell shifting unit | Windows | Length of queue | Cell sender | Remaining band | Remaining queue | Cell to be transmitted |
|---|---|---|---|---|---|---|---|---|---|
| occupied | another node | ○ | (1,2) occupied | open W>0 | (1) Q>0 | ↘ | W | Q | occupied |
| | self-node | | | | | cell shifting unit | W-1 | Q-1 | occupied |
| idle | self-node | | (1,1) idle | | | | | | |
| | another node | | | | | cell transmitting unit | | | |
| released | self-node | | | | | ↗ | W | Q-1 | occupied |
| | another node | | (1,3) released | | | | | | |
| occupied | another node | ○ | (2,2) occupied | | (2) Q=0 | ↘ | W | 0 | occupied |
| | self-node | | | | | cell shifting unit | | | |
| idle | self-node | | (2,1) idle | | | | W-1 | 0 | released bound for self-node |
| | another node | | | | | cell transmitting unit | | | |
| released | self-node | | | | | ↗ | W | 0 | released |
| | another node | | (2,3) released | | | | | | |
| occupied | another node | ○ | (3,2) occupied | closed W=0 | (3) Q>0 | ↘ | 0 | Q | occupied |
| | self-node | | | | | cell shifting unit | | | |
| idle | self-node | | (3,1) idle | | | | 0 | Q | idle |
| | another node | | | | | cell transmitting unit | | | |
| released | self-node | | | | | ↗ | 0 | Q-1 | occupied |
| | another node | | (3,3) released | | | | | | |
| occupied | another node | ○ | occupied | | (4) Q=0 | ↘ | 0 | 0 | occupied |
| | self-node | | | | | cell shifting unit | | | |
| idle | self-node | | idle | | | | 0 | 0 | idle |
| | another node | | | | | cell shifting unit | | | |
| released | self-node | | | | | ↗ | 0 | 0 | released |
| | another node | | released | | | | | | |

PACKET DATA TRANSMISSION UNIT HAVING OCCUPIED, IDLE, AND RELEASED STATES THEREFOR

BACKGROUND OF THE INVENTION

1. Field of the Invention

This invention relates to a data transmission unit used as a node, a number of which organize a ring ATM (Asynchronous Transfer Mode) network. The data transmission units connected together in a ring via transmission paths to transmit data by using packets called cells.

This invention is especially effective for an optional transmission unit to transmit multimedia information to another unit.

2. Description of the Related Art

One of conventional data transmission units organizing a ring ATM network is disclosed in "A study on the architecture of a high-speed ring network(ATMR)" (Ito, et al : Switching Systems Engineering, IEICE Technical Report).

This ATMR network system is, as shown in FIG. 1, a ring-type distributed node system organized by a number of data transmission units (access nodes : hereinafter referred to as ANs) connected together in a pair of rings which circulate data in opposite directions. Each AN is connected with terminals. Data are transmitted and received between terminals via ANs by ATMR cells passing round the transmission rings. The ATMR cell consists of a binary digit string having a format shown in FIG. 2. The format is composed of a 12 bit access control field (ACF), a 16 bit ring virtual channel number (RVCN) comprising an access node address (ANA) and a logical channel number (LCN), 4 bit undefined bits, an 8 bit header check sequence and the user information of 48 octets carrying the contents of data.

The ACF indicates whether the ATMR cell is occupied with effective user information or not.

Having data transferred from its terminal, the AN receives an available unoccupied ATMR cell from the transmission ring, occupies the cell with both the data and the ANA, and transmits it to the transmission ring.

On the other hand, having received an occupied ATMR cell, the AN transmits the cell as it is to a next AN unless it is bound for the AN itself. When it is, the AN transfers the information set in the ATMR cell to the terminal, surrenders the cell to get back to the transmission ring. Hereafter, data transmission is continued in the same way.

The following is a description of impartial cell access (fairness) among ANs which must be guaranteed when multimedia information is transmitted by applying the ATMR system to a videoconference system or to an image distribution system. The fairness means that each AN must carry out transmission according to the qualities of each transmission datum, such as reliability or allowed delay time.

The reason that the fairness must be guaranteed is as follows.

Each AN can carry out data transmission only when it has received an unoccupied ATMR cell. If a single AN continues to transmit data exclusively, causing the other ANs to have delay time, it may result in poor display of image data and the like which require to be transmitted with a limited delay time.

Thus, the function to guarantee the fairness is very important, which determines the performance of the whole system.

According to the ATMR system, the fairness is guaranteed by assigning the number of usable ATMR cells as a window size to each AN.

Provided with a counter to count the number of used ATMR cells, each AN surrenders data transmission after exhausted the assigned size of window. After having exhausted the window, the AN transmits any unoccupied ATMR cell it receives to a next AN even it has data to be transmitted. Consequently, any AN can begin to carry out data transmission at the latest after all the other ANs have exhausted their windows. When all the ANs have exhausted their windows, their counters are reset and all the ANs can resume data transmission.

Reset of the counters is carried out as follows.

Each AN sets its own node address in the ACF of all the ATMR cells it transmits while its window is remained. On the other hand, having already exhausted the assigned window, the AN transmits a received ATMR cell to a next AN without changing the contents of the ACF. When an ATMR cell setting in the node address of an AN comes back to the AN after passing round the whole transmission ring without being changed the contents of the ACF, that means the other ANs have exhausted their windows. When the AN also has already exhausted the window at the point it receives the cell, it checks if the address set in the received ACF is identified with its own node address. If it is, the AN transmits a special cell called a reset cell so that the other ANs can reset their counters. Consequently, each AN can resume data transmission for assigned window.

Thus, the number of ATMR cells used by each AN until the counter is reset is guaranteed by assigning a window size as above.

Furthermore, the window size may be assigned depending on the allowed delay time of each medium so that data which have limited delay time can be transmitted preferentially to guarantee the fairness among media.

The construction of one of the ANs is described as follows based on FIG. 3. As mentioned above, the ANs are connected together for data transmission in a pair of rings which circulate data in opposite directions. Since both transmission rings have the same construction for data transmission, the following description is referred to one of them.

Cell receiving unit 12 of AN 11 analyses the RVCN (ANA+LCN) set in the cell header of an ATMR cell received from one end 13a of transmission ring 13. If the ATMR cell is judged to be bound for the AN 11 (if the ANA is identified with the address of the AN 11), it is converted into a cell having a standard format and transferred to terminal 21 via receiving buffer 14.

Cell shifting unit 15, when the ANA of a received ATMR cell is identified with the address of the AN 11, shifts the ATMR cell to an unoccupied ATMR cell and transmits it to another end 13b of the transmission ring 13 according to the direction of state transition control unit 18 which is described later. This makes an ATMR cell be released at the destination AN and be occupied again by an AN positioned after the AN to improve the coefficient of utilization of the ring by increasing total throughput. On the other hand, when the ANA is not identified with the address of the AN 11, it transmits the cell to the end 13b.

Transmitting buffers 16 temporarily store the cells transferred from the terminal 21. Each of the transmitting buffers 16 corresponds to the priority of each cell according to its quality class in transmission, and each of the cells transferred from the terminal 21 is stored to the corresponding transmitting buffer 16.

Cell transmitting unit 17 converts cells stored in the transmitting buffers 16 into ATMR cells having the format shown in FIG. 2 according to the direction of the state transition control unit 18, and transmits them through the end 13b of the transmission ring 13 to a next AN 11.

The state transition control unit 18 shifts the state of an ATMR cell received from the end 13a, based on both the ACF and various internal conditions of the AN 11 such as the number of the cells stored in the transmitting buffers 16 waiting to be transmitted, the size of remaining window, the value indicated by a timer for checking the delay time of transmission which are all managed by the state transition control unit 18, and directs either the cell shifting unit 15 or the cell transmitting unit 17 to transmit data.

Each of the ANs 11 organizing the ATMR system has the same construction, and the communication in the whole system is under the distributed control of each AN 11 based on the ACF and other units in the cell header.

The ATMR system provided with double transmission rings can maintain the reliability of the network by the control of a managing node (center node) switching from a current use ring to a stand-by ring and loopback when a trouble arose.

The switching from a current use ring to a stand-by ring means that one of the two transmission rings (a current use ring) is switched over to the other transmission ring (a stand-by ring) when any trouble arose in the original ring, in order to prevent the operation of the network from interrupting.

For example, as shown in FIG. 4 (a), under the conditions that the right-handed transmission ring R is used as the current use ring and the left-handed transmission ring L as the stand-by ring, if a trouble arises at a point between AN-B and AN-C on the right-handed transmission ring R, the operation of the network can be continued by being switched over to the left-handed transmission ring L.

The loopback means turning back of signals by the ANs positioned both sides of the troubled point to continue the operation if troubles arose on both of the rings at the same time. For example, as shown in FIG. 4 (b), even if troubles arise between AN-D and AN-E on both the rings, all the nodes can continue to communicate by the AN-D and AN-E loopback.

Moreover, the loopback can be also applied to the case shown in FIG. 4 (a) by turning back signals at AN-B and AN-C.

The ATMR system described heretofore trying to realize a network having higher fairness and more throughput has some drawbacks as follows.

After an AN (AN-M) having a large number of data began to transmit data by using every unoccupied ATMR cells received, the ANs positioned between the AN-M and the destination AN(AN-N) can not carry out data transmission until the AN-M exhausts the window size.

When the AN-M has ended its transmission, ANs positioned both closer in lower stream to the AN-M are given higher priority of transmission.

An AN which exhausted the window can not carry out data transmission until all the other ANs exhaust their windows.

Thus, fairness among ANs is guaranteed in the entire number of transmittable ATMR cells until their counters are reset, but not in a comparatively short term and in the order of data transmission. Also, it is difficult to shorten the delay time to be guaranteed.

Furthermore, when a trouble arose, no ATMR cell can pass round the transmission ring until the operation of the network is restored by switching of the transmission paths or loopback. These restoring are directed by the center node which spends some-time to respond to a notice from an AN detected the trouble, causing an interruption of communication.

SUMMARY OF THE INVENTION

An object of the present invention is to provide a data transmission unit which is guaranteed fairness among a number of such units in the transmitting capacity in a comparatively short term and in the order of data transmission as well as in the transmitting capacity in a comparatively long term, and which gives as short delay time of transmission as possible.

The above object can be achieved by a data transmission unit, a number of which are connected together in a ring via transmission paths to transmit data by using packets having fixed length comprising a transmitting device for having the packet hold data and transmitting it to the transmission paths, a transmission requirements holding device for holding the requirements for transmission which can substantially indicate a counting period to count the number of packets to be transmitted and the number of packets usable in the counting period, a transmitting packet number counting device for counting the number of packets to be transmitted, and a controlling device for judging whether the value indicated by the transmitting packet number counting device satisfies the requirements for transmission or not and admitting the transmission of the packet when it satisfies.

According to the above construction, each of the data transmission units connected together in a pair of rings via transmission paths can judge whether the value indicated by the transmitting packet counting device satisfies the requirements for transmission or not independently by the controlling device provided to each of the units.

Consequently, successive data transmission by a single data transmission unit which hinders the other units from transmitting their data can be minimized. This leads to the improvement of the fairness and the reduction of delay time of data transmission.

The above object can be achieved also by a data transmission unit, a number of which are connected together in a ring via transmission paths to transmit data by using packets having fixed length comprising a transmitting device for having the packet hold data and transmitting it to the transmission paths, a transmitting packet number counting device for counting the number of packets to be transmitted, a received packet discriminating device for discriminating the state of a received packet to be either occupied, idle or released, a controlling device for allowing the transmitting device to transmit an occupied packet at least when a received packet is idle and there are data to be transmitted until the number of packets reaches the number of usable packets assigned to the data transmission unit, allowing the transmitting device to transmit an occupied packet only when a received packet is released and there are data to be transmitted after the number of transmitted packets exceeded the number of usable packets assigned to the data transmission unit, and allowing the transmission device to transmit a released packet when a received packet is idle and there is no data to be transmitted before the number of transmitted packets reaches the number of usable packets assigned to the data transmission unit.

According to the above construction, the data transmission unit can use a released packet transmitted by another unit even after the number of its usable packets exceeds the number of the assigned packets.

This also leads to the improvement of the fairness and the reduction of delay time in data transmission.

Another object of this invention is to provide a data transmission unit capable of preventing the network from interrupting or of minimizing damage caused by a trouble arisen in the transmission ring until it is restored by loopback.

The above object can be achieved by a data transmission unit, a number of which are connected together in a ring via transmission paths to transmit data by using packets having fixed length comprising a receiving device for receiving a packet from the transmission path, a proceeding device for proceeding the receiving operation based on packets received by the receiving device, a transmitting device for transmitting a predetermined packet to the transmission path according to the proceeded results by the proceeding device, detecting device for detecting an error of the receiving device, dummy packet generating device for generating a dummy packet when the error is detected by the detecting device to input the dummy packet to the proceeding device instead of the receiving device.

According to the above construction, all the data transmission units can continue data transmission even they do not receive packets from the transmission paths because the proceeding device proceeds the receiving operation based on the dummy packets generated by the dummy packet generating device.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 is a table showing the relationship between ring cells received and transmitted by a node, based on the received ring cell.

FIG. 11 shows the relationship between both ring cells outputted from the cell shifting unit and the selector.

FIG. 12 is a table showing the relationship between the both ring cells received and transmitted by the node, based on the conditions inside the node.

DESCRIPTION OF THE PREFERRED EMBODIMENT

The following is an example of a ring network system organized by data transmission units of the present invention. [The entire construction of the ring network system]

Figure 1:
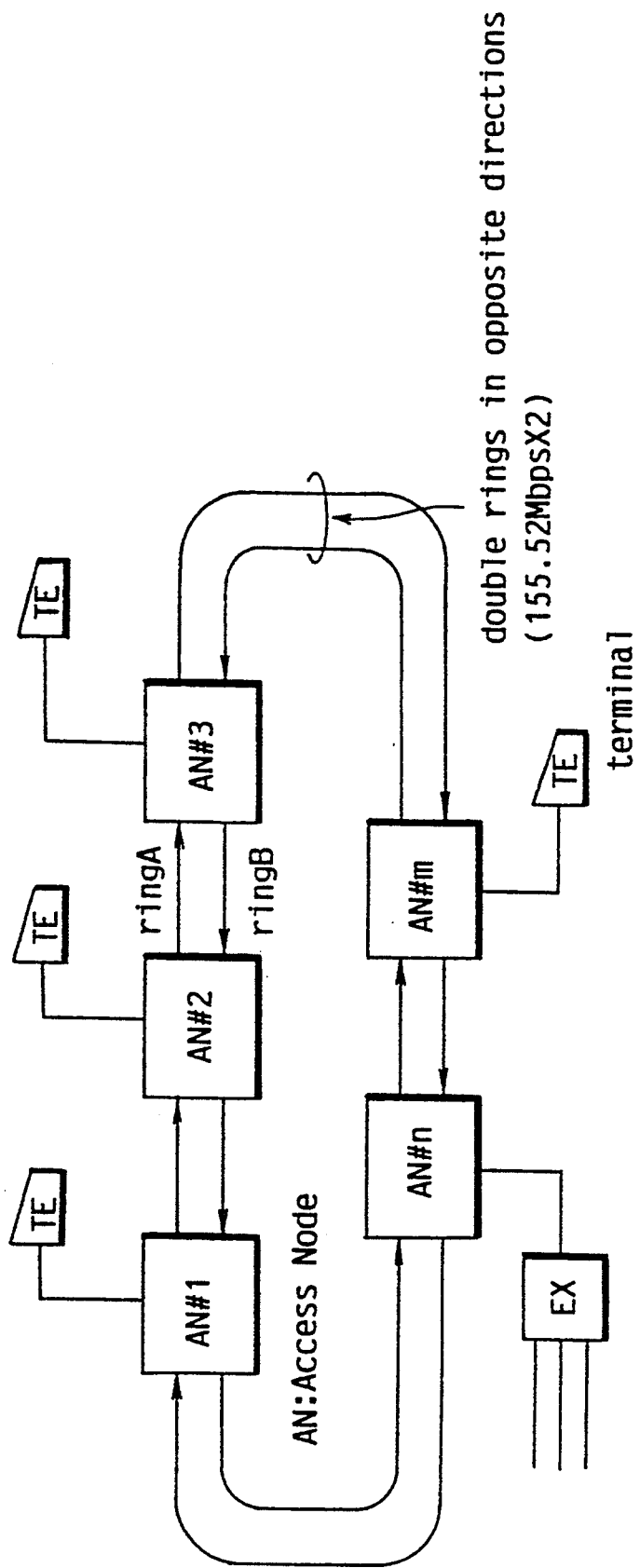
FIG. 1 shows the entire construction of a conventional ring ATM network system (ATMR system).
Figure 2:
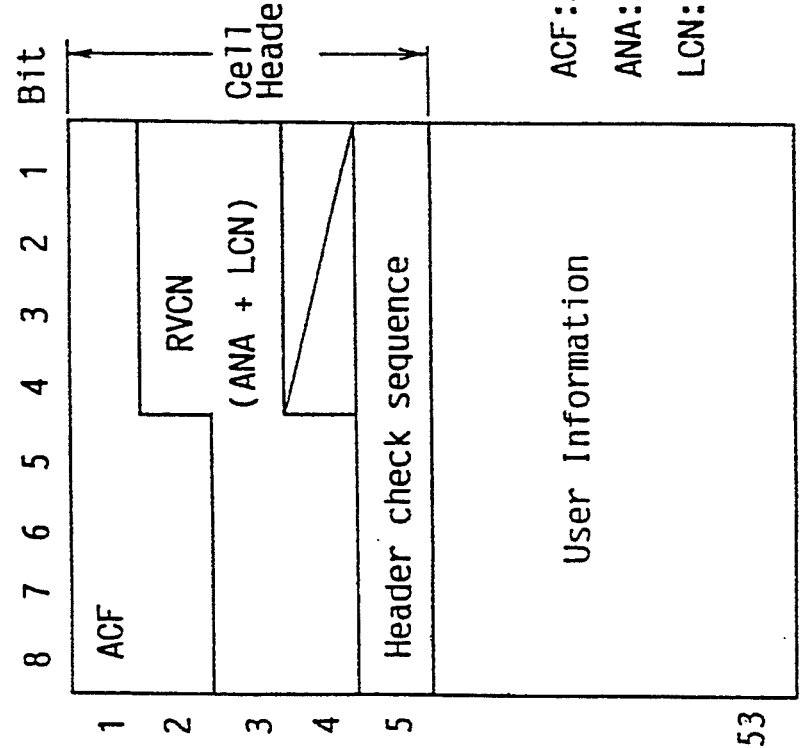
FIG. 2 shows a format of an ATMR cell used for the ring network system.
Figure 3:
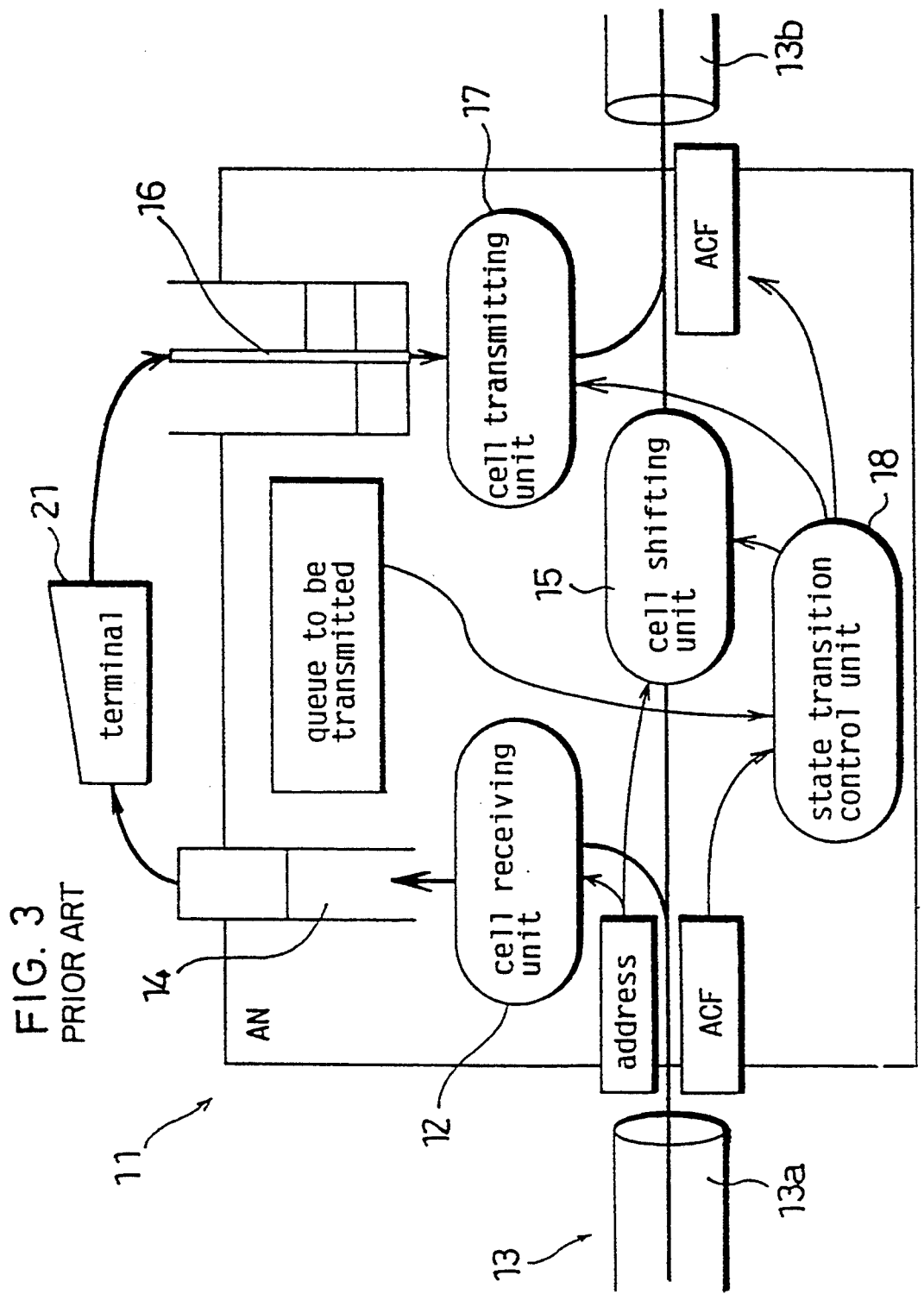
FIG. 3 is a block diagram showing the construction of one of access nodes (ANs) organizing the ATMR system.
Figure 4A:
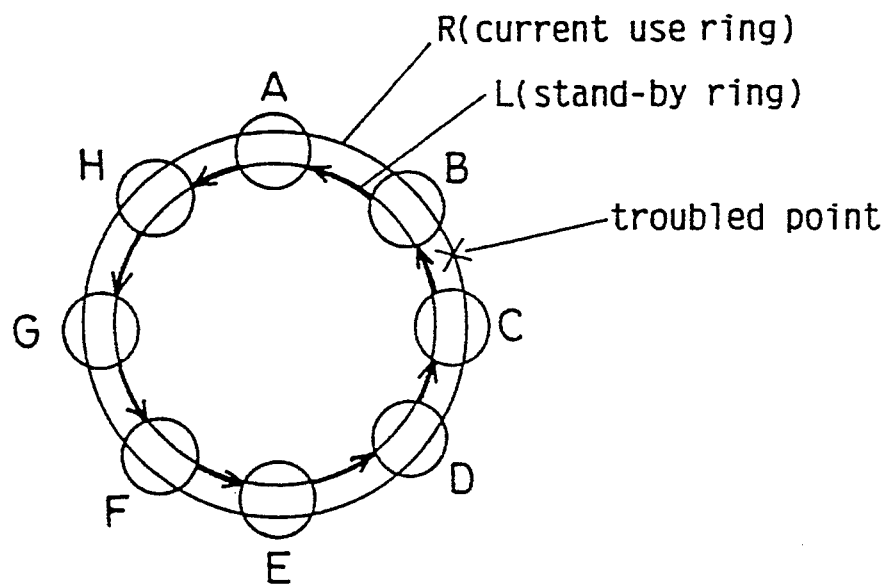
FIG. 4(a) shows switching from a current use ring over to a stand-by ring of the ring network system.
Figure 4B:
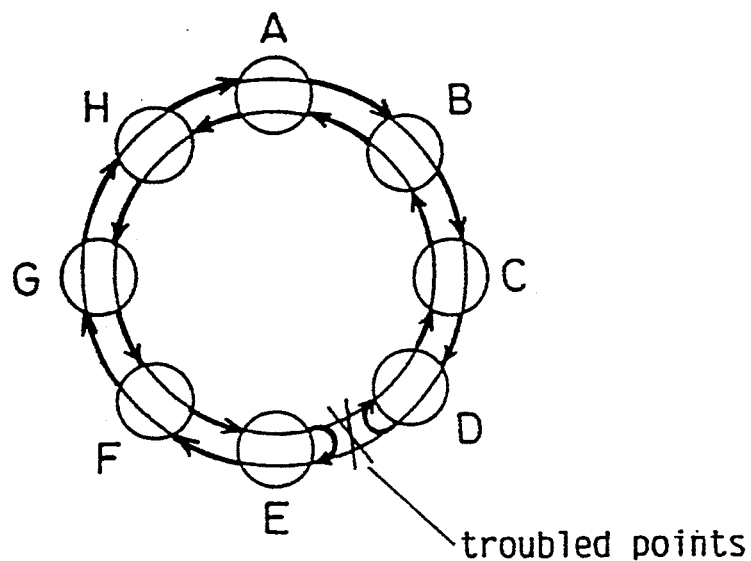
FIG. 4(b) is an illustration showing the operation of loopback of the ring network system.
Figure 5:
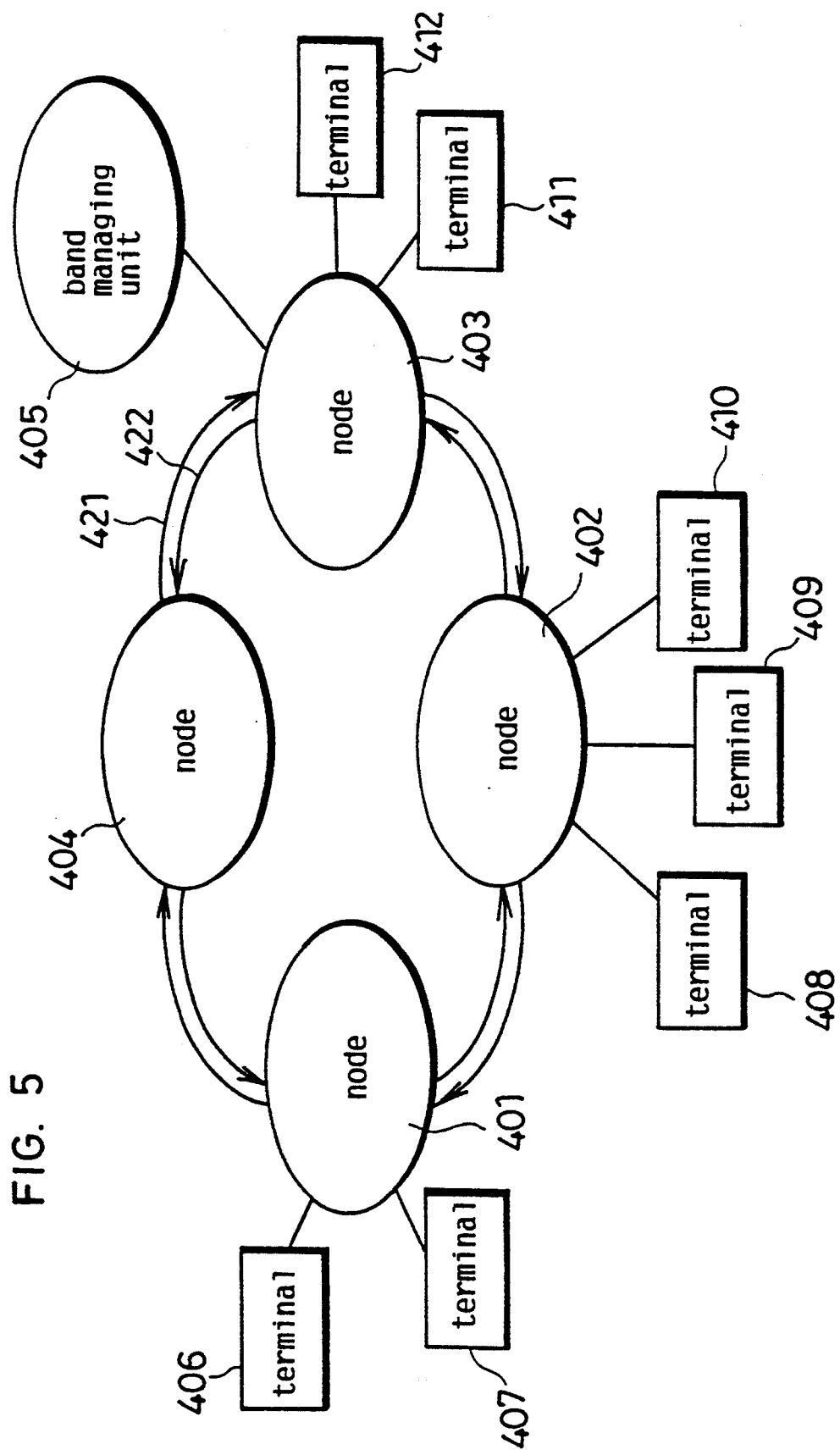
FIG. 5 shows the entire construction of a ring network system using a data transmission unit of the present invention.

In FIG. 5, there are nodes 401-404 connected together in a pair of rings 421 and 422 which circulate data in opposite directions, band managing unit 405 for managing assignment of later described window band to each of the nodes 401-404, terminals 406-412 each connected with each of the nodes 401-404.

Figure 6:
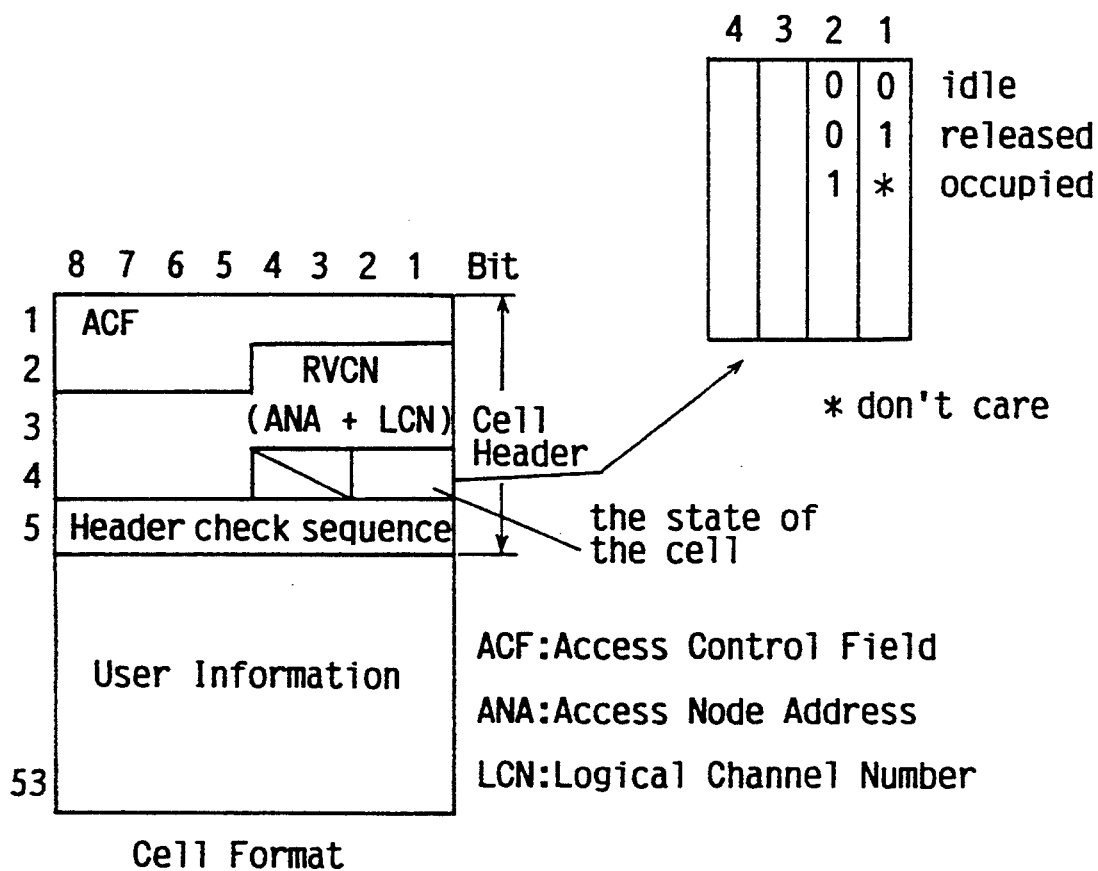
FIG. 6 shows a format of a ring cell used in the ring network system of the same.
Figure 7:
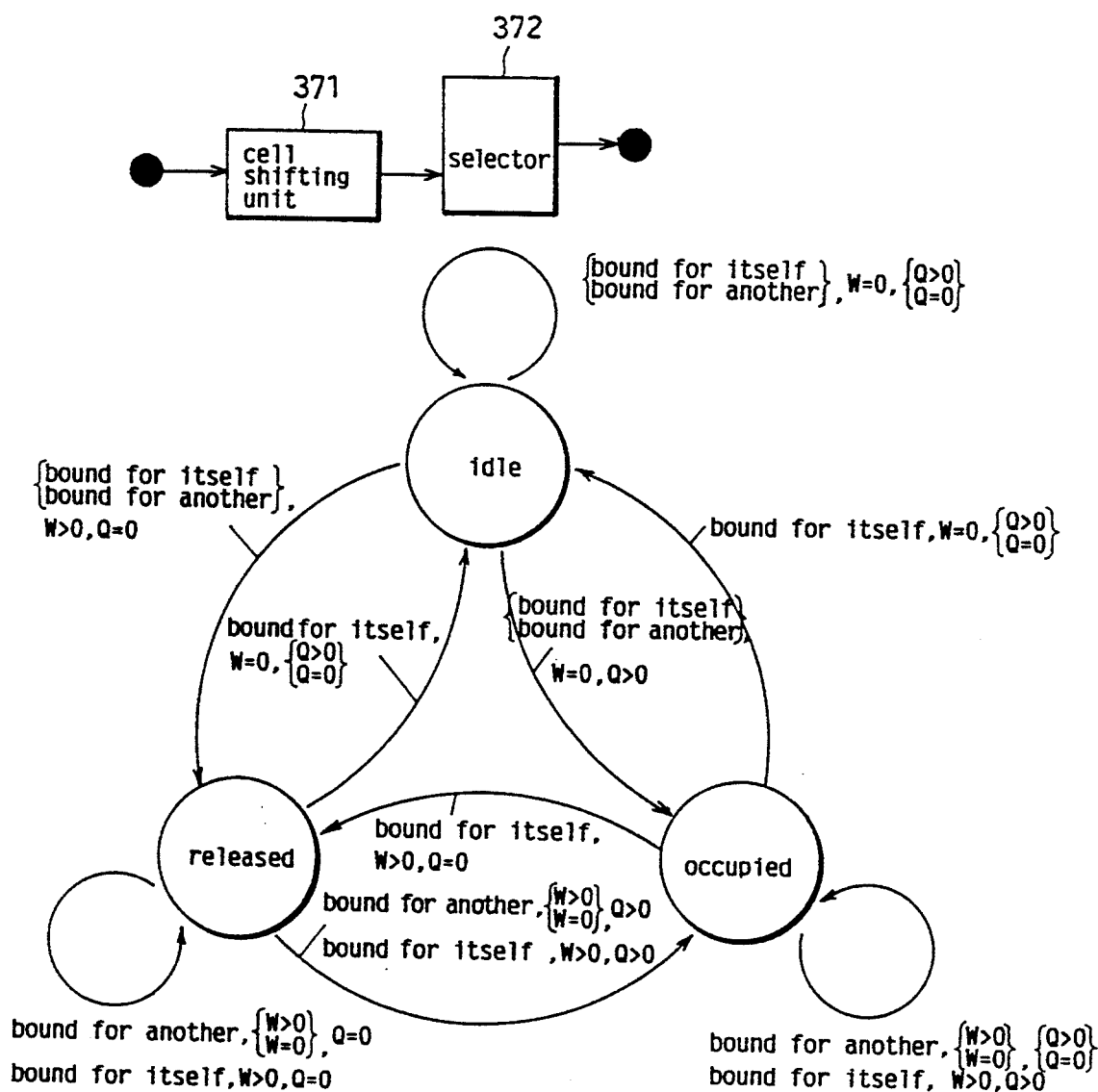
FIG. 7 shows the state of both ring cells received and transmitted by a node of the present invention.

Data transmission between the nodes are carried out by using ring cells which are packets having fixed length passing round transmission rings 421 and 422. The ring cell is composed of a binary digit string having a format shown in FIG. 6, which comprises a 5 octet header unit and a pay load carrying the user information of 48 octets. The header unit is composed of a 12 bit access control field (ACF), a 16 bit ring virtual channel number (RVCN), 2 bit undefined bits, 2 bit state indication bits for indicating the state of the ring cell characteristic of this invention and an 8 bit header check sequence. The above RVCN comprises an access node address (ANA) and a logical channel number (LCN) for indicating the addresses of the node and the terminal of the destination. The state indication bits indicate the ring cell to be occupied, idle, or released which are described later.

Data are transferred and received between the terminals and the node by using such a cell having broadband ISDN standardized format (hereinafter referred to as terminal cells). The terminal cell includes the terminal address indicating the destination terminal.

Since the formats of the ring cell and the terminal cell are different from each other, each node converts a terminal cell transferred from its terminal into a ring cell to transmit to the destination node, while the destination node converts a received ring cell into a terminal cell to transfer to its terminal.

A Window Band

A window band represents the number of ring cells that each node can use in a certain unit of time (for example, one second) as a rule.

Proper assigning of a window band allows data for the window band to be transmitted substantially without fail. As is described later, since data transmission exceeding the window band may be carried out depending on the state of the node, even burst transmission can be done with a short delay time.

The assignment of the window band is managed by the band managing unit 405 upon request of each node 401-404, according to the number of the terminals connected with the node, characteristics and requested transmission quality of data determined by source media, whether the data transmission is a connection type or a connectionless type, and the size of already assigned window band. In the case of the connection type, window band can be assigned upon request of each of the nodes 401-404, while in the case of the connectionless type, it can be predetermined.

One example of the actual assignment of the window band is "20 can be used out of 1400 ring cells received by a node". Also, when the transmission speed of the ring cell is 1.4 Mcells/sec., "20 cells per 1/1000 sec.-(measuring period)" and "the measuring period is 1/1000 sec. and 20 kcells/sec." mean the same. However, it is important that "20 cells per 1/1000 sec." and "10 cells per 1/2000 sec." do not result in the same even the number of the usable cells in one second is the same. Having long measuring period is advantageous when a large number of data must be transmitted in succession, while having short measuring period is advantageous when delay time must be as short as possible even successive data are few. The dispersion of delay time can be minimized by randomizing the frequency of use of ring cells by making the measuring periods of each of the nodes different or by staggering the measuring timing. Whether the assigned ring cells are used periodically or for burst transmission depends on each node.

Conditions of a Ring Cell

The following is a description of the state of a received and a transmitted ring cells.

(1) Occupied Ring Cell

An occupied ring cell is a ring cell carrying user information to be transmitted.

When a node receives such a cell, it transmits the cell as it is to a next node if the address set in the RVCN belongs to another node. On the other hand, if it is bound for the node itself, it transfers the information to its terminal and transmits the ring cell which will be occupied, idle, or released depending on the presence of remaining window band and of data to be transmitted through the same process as the idle cell described in (2) is received.

(2) Idle Ring Cell

An idle ring cell is similar to the unoccupied cell of the ring network system cited in the Related Art.

When a node has received an idle ring cell, it can use the cell as long as it has its assigned window band left ($W>0$) and data to be transmitted ($Q>0$). At that time, the assigned window band decreases ($W-1$).

When there is no data to be transmitted ($Q=0$), the node transmits a released ring cell which will be described at (3) even if there is a window band left ($W>0$). At that time, the window band decreases as exhausted, and sets its address in the RVCN of the released ring cell. The purpose of setting in the address is different from that of the original, which is described at (3). The address can be set also in ACF or another unit instead of RVCN. When it is set in RVCN, there is no need to provide a circuit for identifying the node address set in ACF because a circuit for detecting the destination of an occupied cell can be used.

Having already exhausted the window band($W=0$), the node transmits the received idle ring cell as it is to a next one so that the other nodes having remaining window bands can carry out data transmission.

(3) Released Ring Cell

A released ring cell is a cell released when a node has surrendered data transmission because there is no data to be transmitted($Q=0$) although it has window band left ($W>0$).

When the other nodes than the one whose address is set in the RVCN have received a released ring cell, if they have data to be transmitted($Q>0$), they can occupy the ring cell whether they have window band left or not. Here, it is remarkable that a node which cannot use an idle cell because it has exhausted the window band ($W=0$) can occupy such a cell. Such an effective use of ring cells passing round the transmission ring 421 can avoid problems caused by the assignment of window band (for example, burst transmission can not necessarily be completed). When a node having the window band left uses such a ring cell, its window band does not decrease because the node uses the ring cell transmitted by another node by surrendering data transmission.

Having received a released ring cell, if it does not have data to be transmitted ($Q=0$), it transmits it as it is to the next.

On the other hand, when the node receives a released ring cell setting its own node address, in other words, when the ring cell released by the same node has come back after passing round the transmission ring 421 because no other nodes have data to be transmitted, it is processed in the same way as the case of the idle ring cell. This means that when the node has window band left($W>0$) and has data to be transmitted ($Q>0$), it can carry out data transmission, while when it does not have data to be transmitted ($Q=0$), it transmits the released ring cell again. When it has exhausted the window band ($W=0$), it converts the released ring cell into an idle ring cell so that the other nodes can carry out data transmission.

Construction of Each of the Nodes

Figure 9:
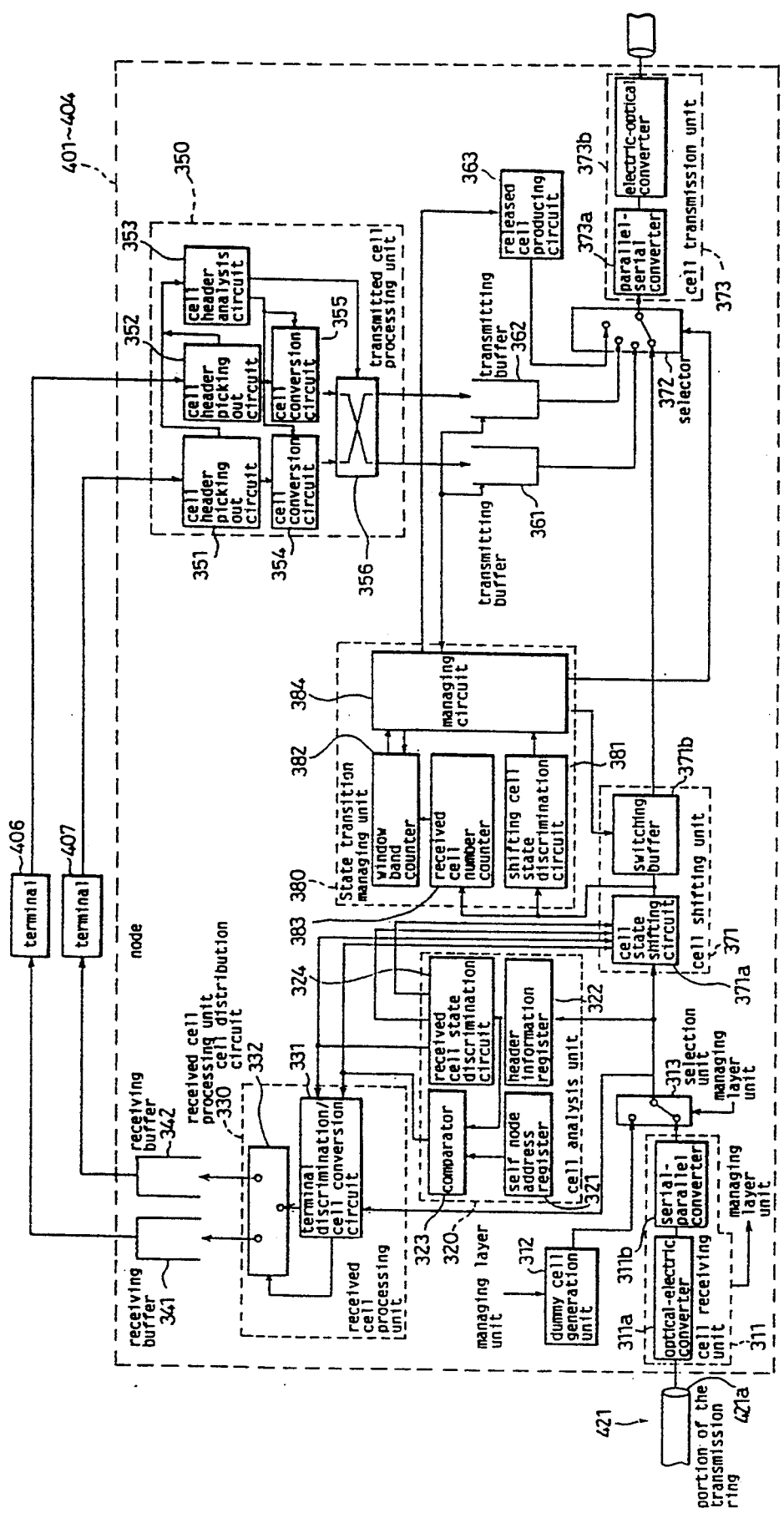
FIG. 9 is a block diagram showing detailed construction of the node.

FIG. 9 shows the nodes 401-404 connected together in a pair of rings 421 and 422 which circulate data in opposite directions. Since each of the rings has the same construction, the following description is about one of them. The description of the control unit and other units provided in the node to communicate with the band unit 405 is omitted.

Cell receiving unit 311, mainly composed of optical-electric converter 311a and serial-parallel converter 311b recognizes boundaries and arrival of ring cells based on the signals received from portion 421a of the transmission ring 421, and outputs, for example, 8 bit signals.

Dummy cell generation unit 312 Generates dummy cells when the cell receiving unit 311 does not receive a ring cell from the transmission ring 421 owing to transmitting trouble or another cause.

Selection unit 313 selects either a ring cell received by the cell receiving unit 311 or a dummy cell generated by the dummy cell generation unit 312. These two units will be described precisely later.

Cell analysis unit 320 analyzes the cell header of a ring cell received by the cell receiving unit 311 to find its destination and the state. The cell analysis unit 320 comprises self node address register 321, header information register 322, comparator 323 and received cell state discrimination circuit 324. The self node address register 321 holds the self node address of the node. The header information register 322 temporarily holds the cell header of a received ring cell. The comparator 323 outputs a signal indicating whether or not the self node address held in the header information register 322 is identified with the node address set in the cell header of the header information register 322. The received cell state discrimination circuit 324 outputs signals depending on the detected state of the ring cell based on the state indication bits in the cell header.

Received cell processing unit 330 is composed of terminal discrimination/cell conversion circuit 331 and cell distribution circuit 332. The terminal discrimination/cell conversion circuit 331 outputs terminal discrimination signals based on the terminal address set in the RVCN of the ring cell and converts a ring cell into a terminal cell when the cell analysis unit 320 has detected that the received ring cell is bound for the node itself and is occupied. The cell distribution circuit 332 delivers the converted terminal cells to receiving buffers 341 and 342 in order to transfer them to each terminal, based on the terminal discrimination signals.

The receiving buffers 341 and 342 are provided to adjust the difference between the transmitting speed of the transmission paths and the transferring speed between the transmission rings and the terminals. The capacity of the receiving buffers are determined according to statistics considering the dispersion of transmitting speed. The terminal cells stored in the receiving buffers 341 and 342 are transferred to each terminal through unillustrated transferring paths. Thus, since cells are transferred to the terminals according to the terminal addresses, it is easy to enhance the coefficient of utilization of the entire system by connecting a number of terminals with each node.

Transmitted cell processing unit 350 converts terminal cells transferred from terminals into ring cells and stores them to the transmitting buffers 361 and 362 depending on their quality classes of communication.

The transmitted cell processing unit 350 comprises cell header picking out circuits 351 and 352, cell header analysis circuit 353, cell conversion circuits 354 and 355, and distribution circuit 356. The cell header picking out circuits 351 and 352 pick out the cell header from a terminal cell transferred from a terminal. The cell header analysis circuit 353 having a table to indicate with which node a terminal is connected, and the like, products the node address of the destination and discriminates the communicative quality class of the cell based on the table and the cell header picked out by the cell header picking out circuits 351 and 352. The cell conversion circuits 354 and 355 input the node address of the destination produced by the cell header analysis circuit 353 and state indication bits to the RVCN of the terminal cell, consequently to convert the cell into an occupied ring cell. The distribution circuit 356 stores ring cells outputted from the cell conversion circuits 354 or 355 to the transmitting buffers 361 or 362 based on the direction of the cell header analysis circuit 353.

The transmitting buffers 361 and 362 are provided according to the quality class in transmission of data. If the transmitting buffer 361 has priority over the other buffer 362, the ring cell stored in the transmitting buffer 361 is transmitted with priority. For example, the ring cells stored in the transmitting buffer 361 are transmitted by larger rate than those in the buffer 362. When window bands of different sizes are assigned to the transmitting buffers 361 and 362, the bigger one is assigned to the transmitting buffer 361. Moreover, the transmission buffers may be provided to for each terminal so that the terminals can be assigned priorities.

Released cell producing circuit 363 produces a released cell setting its own node address in the RVCN.

Figure 10:
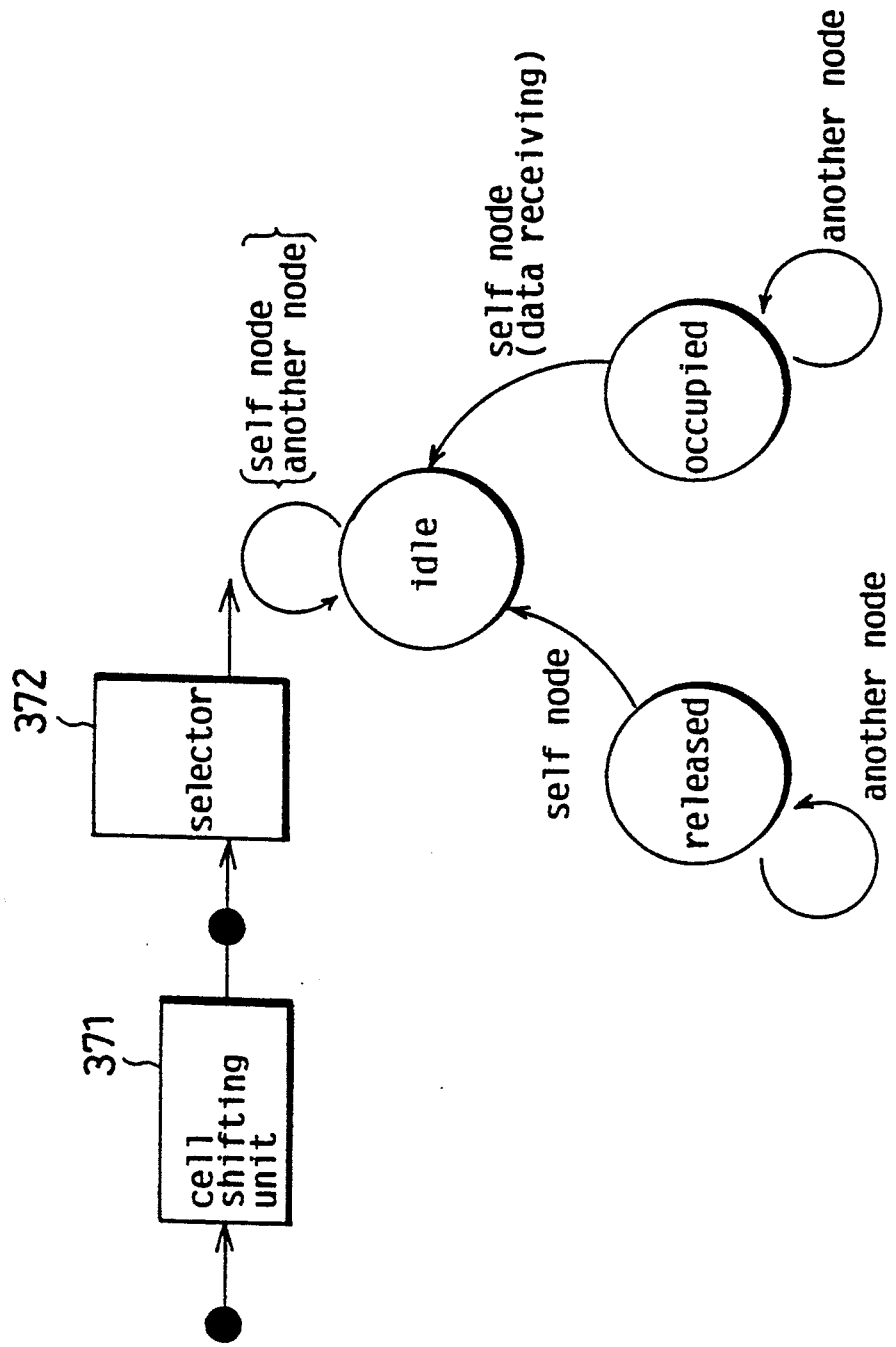
FIG. 10 shows the relationship between both ring cells inputted and outputted from the cell shifting unit.

Cell shifting unit 371 is composed of cell state shifting circuit 371a and buffer 371b. The cell state shifting circuit 371a shifts the state of a ring cell based on the signals indicating the destination and the state of the received cell outputted from the cell analysis unit 320. More precisely, as shown in FIG. 10 and the left of FIG. 8, the cell state shifting circuit 371a shifts a received ring cell to an idle cell when the received cell is (1) bound for itself and occupied or (2) bound for itself and released, and outputs the received ring cell without shifting the state when it is (3) bound for another node or idle.

Some of the ring cells (1)(2) are shifted to idle cells because dividing the state transition process into two steps makes the procedure easier (for example, the node address of the destination need not be considered in the procedure of later-mentioned state transition managing unit 380) and omits new idle ring cell producing circuit. However, the procedure is not necessary divided into two steps. The buffer 371b temporarily holds a ring cell outputted from the cell state shifting circuit 371a until it is determined which cell is transmitted, this cell or a cell from one of the transmitting buffers 361 and 362.

Selector 372 selects one ring cell out of those outputted from the cell shifting unit 371, the transmitting buffers 361 and 362 and the released cell producing circuit 363 based on the direction of later-mentioned state transition managing unit 380.

Cell transmission unit 373 mainly composed of parallel-serial converter 373a and electric-optical converter 373b, transmits a ring cell selected by the selector 372 to the other portion 421b of the transmission ring 421 as an optical signal.

The state transition managing unit 380 controls the selector 372 and other units so that a proper ring cell can be transmitted based on the state of the ring cell outputted from the cell state shifting circuit 371a of the cell shifting unit 371, the lengths of the queue (Q) in the transmitting buffers 361 and 362, and the remaining amount of the window band (W). The state transition managing unit 380 comprises shifting cell state discrimination circuit 381, window band counter 382, received cell number counter 383 and managing circuit 384. The shifting cell state discrimination circuit 381 having the same construction as the received cell state discrimination circuit 324, discriminates the state of a ring cell outputted from the cell state shifting circuit 371a. The window band counter 382 counts down the remaining amount of the window band and indicates the exhaustion of the window band as zero. The received cell number counter 383 counts the number of the ring cells received from the portion 421a of the transmission ring 421 and presets the window band counter 382 when the number has reached a specified value. The managing circuit 384 controls the cell shifting unit 371, the transmitting buffers 361 and 362, the released cell producing circuit 363 and the selector 372 based on the signals outputted from the shifting cell state discrimination circuit 381 and other units.

Figure 13:
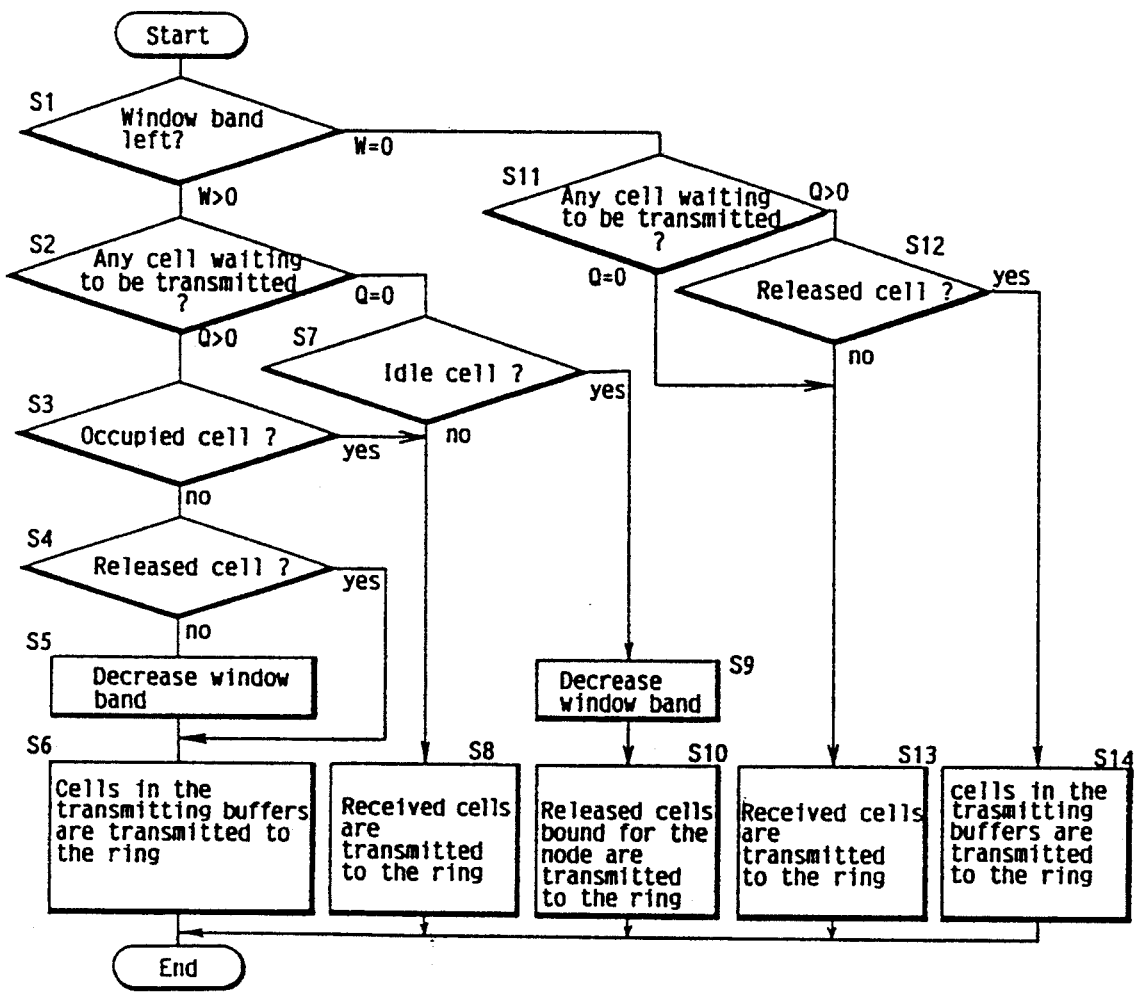
FIG. 13 is a flowchart showing judgement of the state of a ring cell for controlling the node.

The managing circuit 384, more precisely, executes management as shown in FIGS. 11, 12, 13 and the right of FIG. 8. FIGS. 8 and 12 show the same contents, the former being sorted the state of a received ring cell as the key, and the latter being sorted the remaining amount of the window band(W) and the length of the queue (Q) in the transmitting buffers 361 and 362 as the key. Although FIG. 13 shows a sequential judgement of conditions for the controls, in an actual hardware circuit, parallel judgements of the conditions can be constructed by using AND gates, OR gates or the like.

In the following description, (number) or (number.-number) represent each column of FIG. 12, and (S number) corresponds to each step of FIG. 13.

The managing unit 384, when a ring cell is outputted from the cell state shifting circuit 371a, judges the existence of the remaining window band (S1), and the existence of a waiting ring cell at the transmitting buffers 361 and 362 (S2 and S3). After that, the operation breaks into two as follows. (1) when the window band is left (S1:W>0), and the transmitting buffers 361 and 362 have data (S2:Q>0), (1.1) if a ring cell outputted from the cell state shifting circuit 371a is idle (S3:no, S4:no), the managing circuit 384 orders either the transmitting buffers 361 or 362 to output a cell, and the selector 372 to select one. Then, the occupied ring cell stored in the head of the transmitting buffers 361 and 362 are outputted to the transmission ring 421 (S6). Here, the window band counter 382 decrements (S5).

(1.2) if a ring cell outputted from the cell state shifting circuit 371a is occupied (S3:yes), the managing circuit 384 orders the selector 372 to select the signal of the cell shifting unit 371. Because the ring cell must be bound for another node, the managing circuit 384 transmits the received ring cell to the transmission ring 421 (S8).

(1.3) if a ring cell outputted from the cell state shifting circuit 371a is released (S3:no, S4:yes), the ring cell occupied at the transmitting buffers 361 or 362 is transmitted to the transmission ring 421 (S6) in the same manner as the above (1.1). However, in this case, the window band counter 382 does not decrement.

(2) if the window band is left (S1:W>0), and there is no data in the transmitting buffers 361 and 362 (S2:Q=0), (2.1) if a ring cell outputted from the cell state shifting circuit 371a is idle (S7:yes), the managing circuit 384 orders the released cell producing circuit 363 to output a released ring cell bound for itself and the selector 372 to select the signal of the released cell producing circuit 363 (S10). Here, the window band counter 382 decrements one (S9). The released ring cell is transmitted in order to give the right of data transmission to another node.

(2.2) (2.3) if a ring cell outputted from the cell state shifting circuit 371a is occupied or released (S7:no), the managing circuit 384 orders the selector 372 to select the signal of the cell shifting unit 371 to transmit the received ring cell to the transmission ring 421 (S8). This is because of no data to be transmitted when the cell is released, and because of the same reason as (1.2) when the cell is occupied. (3) if the window band is not left(S1:W=0), and the transmitting buffers 361 and 362 (S11:Q>0) have data.

(3.1)(3.2) if a ring cell outputted from the cell state shifting circuit 371a is idle or occupied (S12:no), the managing circuit 384 orders the selector 372 to select the signal of the cell shifting unit 371 to transmit the received cell to the transmission ring 421 (S13). This is because the data can not be transmitted because of no window band left when the cell is idle, and because of the same reason as (1.2) when it is occupied.

(3.3) if a ring cell outputted from the cell state shifting circuit 371a is released (S12:yes), the managing circuit 384 orders the transmitting buffers 361 or 362 to transmit an occupied cell to the transmission ring 421 (S14) in the same manner as (1.1). In this case, the window band counter 382 does not decrement.

(4) if no window band is left (S1:W=0) and there are no data at the transmitting buffers 361 and 362 (S11:Q=0), the managing circuit 384 orders the selector 372 to select the signal of the cell shifting unit 371 in the same manner as (3.1) to transmit the received ring cell to the transmission ring 421 (S13), whatever the state of the ring cell outputted from the cell state shifting circuit 371a.

Construction and Operation to Cope with Transmitting Trouble

The following is a description of loopback as an example of procedure and construction against trouble when ring cells become untransmittable because of the trouble arisen in the transmission rings 421 and 422.

When a trouble arises at the upper stream of a node in the transmission ring 421, the cell receiving unit 311 incapable of receiving a ring cell for a certain period of time reports it to unillustrated managing layer unit. The dummy cell generation unit 312 generates a ring cell of either being idle or released as a dummy cell according to the direction of the managing layer unit. The selection unit 313 inputs the ring cell generated by the dummy cell generation unit 312 to the cell analysis unit 320, the received cell processing unit 330 and the cell shifting unit 371 according to the direction of the managing layer unit.

The received cell processing unit 330 never carries out receiving procedure because occupied ring cells are never inputted. On the other hand, the cell analysis units 320, cell shifting unit 371 and the like can transmit ring cell stored in the transmitting buffers 361 and 362 by the ordinary operation. Also, the other nodes positioned lower stream of this node can carry out data transmission by using a ring cell transmitted from this node unless the troubled point is therebetween the transmission ring 421.

In the above example, the dummy cell generation unit 312 and the selection unit 313 are constructed separately, but they may be united.

Figure 14A:
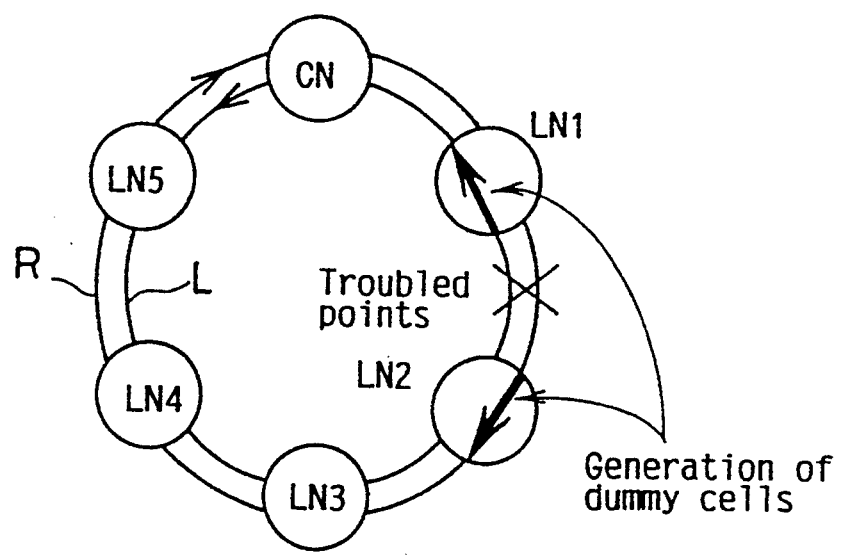
FIG. 14 (a) shows a transmission ring in which a trouble arose.
FIG. 14(b) shows loopback when troubles arose in the transmission ring.
Figure 14B:
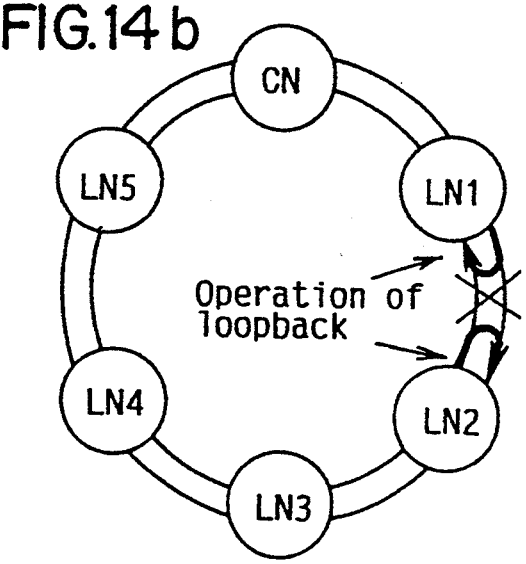

The following is as shown in FIG. 14 (a)(b), a description of the operation of loopback if troubles arise between LN1 and LN2 in the both transmission rings L and R when local nodes(LNs) 1–5 and a center node (CN) are connected together to make both rings L and R in current use.

(1) First, the occurrence of the trouble is detected by each of the cell receiving units 311 in the left-handed ring of LN1 and the right-handed ring of LN2.

(2) Each managing layer unit of LNs 1 and 2 orders each of the dummy cell generation units 312 and each of the selection units 313 in the left-handed ring of LN1 and the right-handed ring of LN2 to generate a dummy cell and to select it respectively. Consequently, data transmission in both directions is restored in a very short time as shown in FIG. 14(a).

(3) When the managing layer units of LN1 and LN2 output information of the trouble by using a dummy cell generated by the dummy cell generation unit 312, the information is transmitted to each of the lower stream node like an ordinary data transmission.

(4) The information of the trouble reaches the CN.

(5) If the managing layer unit of the CN detected the troubled point judges that loopback should be done, it directs it to the LNs 1-5 through a physical layer.

(6) As shown in FIG. 14 (b), LN2 turns back right-handed (connect the left-handed cell transmission unit 373 with the right-handed cell receiving unit 311), and LN1 turns back left-handed (connect the right-handed cell transmission unit 373 with the left-handed cell receiving unit 311). At that time, switching is synchronized with the transmission of a dummy cell so that the phase of the dummy cell which is being transmitted can not be turbulent.

Data transmission in the area which is not involved in the trouble is carried out without interruption because the dummy cell generation unit 312 continues to generate dummy cells until the loopback is completed.

(7) When the loopback is completed, LN1 and LN2 report it to the CN, and the network managing unit of the CN confirms the completion.

According to the above example, a node having window band left can carry out data transmission when it received a released ring cell, but a node, only after exhausted the window band, may be designed to carry out data transmission to increase their chances of transmission.

When a node which exhausted the window band receives a released ring cell bound for itself, it transmits an idle ring cell even it has data to be transmitted, but it may be designed to be able to occupy the ring cell.

When a node which exhausted the window band and has no data to be transmitted, received a released ring cell bound for itself, the node transmits an idle ring cell, but it may be designed to transmit the released cell without converting to another or to alternate. The window band may be reset when a node has received an idle or released cell bound for itself.

When a node transmits an released ring cell, the window band decreases (W-1), but it may be designed not to decrease, to decrease once per twice, or to decrease until it reaches a certain amount and keep the rest.

When a node transmits an occupied ring cell by using a ring cell released by another node, the window band does not decrease (W), but it may be designed to decrease.

Consequently, as long as a node is designed, after exhausted the window band, to be able to use a ring cell released by another node which has the window band left and data to be transmitted, the assignment of the window band, the above setting of conditions and the like can be done according to the types and transmission frequency of data to be transmitted because the chances of successful burst transmission and the like is enhanced.

Furthermore, ring cells each of which is one of being occupied, idle and released and those each of which is either occupied or unoccupied may be employed at the same time to transmit Variable Bit Rate (VBR) data and Continuous Bit Rate (CBR) data respectively. These two types of ring cells may be discriminated by a discriminating bit and a window band may be assigned to each ring cell according to its type.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A data transmission unit, a number of which are connected together in a ring via transmission paths to transmit data in the form of packets, each having a fixed length comprising:

transmitting means for inserting user data into a selected packet to create an occupied packet and transmitting the occupied packet to one of said transmission paths and for generating and transmitting a released packet to one of said transmission paths, a released packet being a packet containing no user data and further containing information identifying said packet as a released packet originating from said unit;

transmitting packet number counting means for counting a number of transmitted packets;

receiving means for receiving packets from one of said transmission paths, a received packet being either occupied, idle or released, an idle packet being a packet which contains no user data; and controlling means, responsive to the state of the received packets, for causing the transmitting means to transmit an occupied packet at least when a received packet is idle and there are data to be transmitted and continuing to transmit occupied packets until the number of packets transmitted reaches a selected limit assigned to the data transmission unit and, after said limit has been exceeded, for causing the transmitting means to transmit an occupied packet only when a received packet is in the released state and there are data to be transmitted, said controlling means further being responsive to receipt of a packet in the idle state, and to the concurrent absence of data to be transmitted, to cause the transmission means to transmit a released packet provided the number of transmitted packets has not reached said limit.

2. The data transmission unit of claim 1, wherein the state of a packet is discriminated by the bit pattern of a predetermined area in the packet.

3. The data transmission unit of claim 1, wherein said unit has a number of terminals connected thereto, and further comprising:

received data transferring means for transferring data held in a packet to one of said terminals whose address is held in the packet; and destination setting means for setting a destination address of a data transmission unit connected in said ring to which an occupied packet is to be transmitted.

4. The data transmission unit of claim 1, wherein the transmitting packet number counting means counts released packets as transmitted packets.

5. The data transmission unit of claim 1, wherein the controlling means causes the transmitting means to transmit an occupied packet when a received packet is in the released state and there are data to be transmitted even if the number of packets transmitted has not reached said limit.

6. The data transmission unit of claim 1, wherein when a received packet is in the released state, the transmitting packet number counting means does not count an occupied packet transmitted by the transmitting means as transmitted.

7. The data transmission unit of claim 1, wherein the controlling means responds to receipt of a packet bound for said unit and occupied in the same manner as said controlling means responds to receipt of an idle packet.

8. The data transmission unit of claim 1, wherein said unit is identified by a unit address and wherein, when the number of transmitted packets has not reached said limit and there is no data to be transmitted, the controlling means causes the transmitting means to set said unit address in a released packet to be transmitted, and the controlling means further responds to receipt of a released packet containing said unit address in the same manner as receipt of a packet in the idle state.

9. A data transmission unit of claim 8, wherein the unit address is set in the area in the packet indicating the destination address.

10. A data transmission unit, a number of which are connected together in a ring via transmission paths to transmit data in the form of packets, each having a fixed length and a destination address of a unit to which said packet is to be transmitted, comprising:

transmitting means for inserting user data into a packet to create an occupied packet and transmitting the occupied packet to one of the transmission paths and for generating a released packet and transmitting said released packet onto one of the transmission paths, a released packet being one containing no user data and further containing information identifying said packet as a released packet originating from said unit;

transmitting packet number counting means for counting a number of transmitted packets;

receiving means for receiving packets from one of the transmission paths and including received packet discriminating means for discriminating the state of a received packet to be either occupied, idle or released, and the destination address to be either its own or that of another said data transmission unit, an idle packet being one which contains no user data;

shifting means for receiving a received packet from said receiving means and outputting the received packet after shifting its state to the idle state when the received packet is bound for the unit itself and is occupied or is bound for the unit itself and is in the released state, and for otherwise outputting the received packet without shifting its state;

shifted packet discriminating means for discriminating whether a packet outputted from the shifting means is in the occupied, idle or released state and for generating signals indicative of said state; and controlling means responsive to said signals for causing the transmitting means to transmit an occupied packet when the packet outputted from the shifting means is either in the idle or released state and there are data to be transmitted until the number of transmitted packets reaches a selected limit assigned to the data transmission unit and, after said limit is exceeded, for causing the transmitting means to transmit an occupied packet only when the packet outputted from the shifting means is released and there are data to be transmitted, and for causing the transmitting means to transmit a released packet when the packet outputted from the shifting means is idle and there is no data to be transmitted until the number of transmitted packets reaches said limit.

11. A data transmission unit of claim 10 comprising:

occupied packet generating means for generating an occupied packet;

released packet generating means for generating an released packet;

selecting means for selecting one packet out of those outputted from the shifting means, the occupied packet generating means and the released packet generating means according to the direction of the controlling means.

12. A data transmission unit of claim 10, wherein the transmitting packet number counting means counts released packets as transmitted packets.

13. A data transmission unit of claim 10, wherein the transmitting packet number counting means does not count an occupied packet transmitted by the transmitting means as a transmitted packet when the packet outputted from the shifting means is released.

14. A data transmission unit, a number of which are connected together in a ring via transmission paths to transmit data by using packets, each having a fixed length comprising:

said packets being allocated to one of three states: occupied, idle, or released, an idle packet containing no user information, a released packet containing no user information and containing information identifying it as a released packet originating from said unit;

transmitting means for inserting user data into a packet to create an occupied packet and transmitting the occupied packet to one of the transmission paths and for generating a released packet and transmitting said released packet onto one of said paths;

transmission requirements storing means for storing a counting period over which to count the number of packets to be transmitted and a limit comprising the number of packets allowed to be transmitted in the counting period;

transmitting packet number counting means for counting the number of packets transmitted and outputting a packet count equal to said number; and controlling means, responsive to said packet count, said counting period, and said limit, for causing the transmitting means to transmit an occupied packet if the number of packets counted by the transmitting packet number counting means in said period is less than said limit, at least when a received packet is idle and there are data to be transmitted, for causing the transmitting means to transmit an occupied packet only when a received packet is released and there are data to be transmitted after the number of transmitted packets exceeds said limit, and for causing the transmitting means to transmit a released packet if the number of packets counted by the transmitting packet number counting means is less than said limit, when a received packet is idle and there is no data and until the number of transmitted packets reaches said limit.

15. A data transmission unit, a number of which are connected together in a ring via transmission paths to transmit data by using packets, each having a fixed length comprising:

transmitting means for inserting data into said packets and transmitting it to one of said transmission paths and for generating a released packet and transmitting said released packet onto one of said transmission paths, a released packet being one containing no user data and further containing information identifying said packet as a released packet originating from said unit;

transmission requirements storing means for storing a counting period over which to count the number of packets to be transmitted and a limit comprising the number of packets allowed to be transmitted in the counting period and for outputting said counting period and said limit;

transmitting packet number counting means for counting the number of packets transmitted and outputting a packet count equal to said number;

receiving means for receiving packets from one of said transmission paths and including received packet discriminating means for discriminating the state of a received packet to be either occupied, idle or released, an idle packet being one which contains no user data; and shifting means for receiving a received packet from said receiving means and outputting the received packet after shifting its state to the idle state when the received packet is bound for the unit itself and is occupied or is bound for the unit itself and is in the released state, and for otherwise outputting the received packet without shifting its state;

shifted packet discriminating means for receiving packets outputted from said shifting means for discriminating whether a packet outputted from the shifting means is in the occupied, idle or released state and for generating signals indicative of said state; and controlling means responsive to said signals and supplied with said counting period and said limit from said storing means and with said packet count for causing the transmitting means to transmit an occupied packet if the number of packets counted by the transmitting packet number counting means in said counting period is less than said limit, provided that the packet concurrently outputted from the shifting means is either in the idle state or the released state and there are data to be transmitted, for causing the transmitting means to transmit an occupied packet if the number of packets counted by the transmitting packet number counting means exceeds said limit only when the packet outputted from the shifting means is in the released state and there are data to be transmitted, and for causing the transmitting means to transmit a released packet if the number of packets counted by the transmitting packet number counting means is less than said limit when the packet outputted from the shifting means is concurrently in the idle state and there is not data to be transmitted.

16. A data transmission unit, a number of which are connected together in a ring via transmission paths to transmit data by using packets, each having a fixed length comprising:

receiving means for receiving a packet from the transmission path;

control means for controlling the receiving operation based on the contents of packets received by the receiving means;

transmitting means for transmitting a predetermined packet to the transmission path under direction of said control means;

detecting means for detecting occurrence of an error condition in the receiving means; and dummy packet generating means for generating a dummy packet when the error is detected by the detecting means and for inputting the dummy packet in place of a packet received by the receiving means to said control means; said control means further comprising:

transmitting packet number counting means for counting the number of packets to be transmitted;

receiving means for receiving packets from one of said transmission paths, the state of a received packet being either occupied, idle or released; and controlling means, responsive to the state of the received packets, for causing the transmitting means to transmit an occupied packet at least when a received packet is idle and there are data to be transmitted and continuing to transmit occupied packets until the number of packets transmitted reaches a selected limit assigned to the data transmission unit and, after said limit has been exceeded, for causing the transmitting means to transmit an occupied packet only when a received packet is in the released state and there are data to be transmitted;

said controlling means further being responsive to receipt of a packet in the idle state, and to the concurrent absence of data to be transmitted, to cause the transmission means to transmit a released packet provided the number of transmitted packets has not reached said limit.

17. A data transmission unit, a number of which are connected together in a ring via transmission paths to transmit data by using packets, each having a fixed length comprising:

receiving means for receiving a packet from the transmission path;

control means for controlling the receiving operation based on the contents of packets received by the receiving means;

transmitting means for transmitting a predetermined packet to the transmission path under direction of said control means;

detecting means for detecting occurrence of an error condition in the receiving means; and dummy packet generating means for generating a dummy packet when the error is detected by the detecting means and for inputting the dummy packet in place of a packet received by the receiving means to said control means;, wherein each packet includes a destination address; said control means further comprising:

transmitting means for inserting user data into a packet to create an occupied packet and transmitting the occupied packet to one of the transmission paths;

receiving means for receiving packets from one of the transmission paths and including received packet discriminating means for discriminating the state of a received packet to be either occupied, idle or released, and the destination address to be either its own or that of another said unit, an idle packet being one which contains no user data, a released packet being one containing no user data and further containing an address identifying said packet as a released packet;

shifting means for receiving a received packet from said receiving means and outputting the received packet after shifting its state to the idle state when the received packet is bound for the unit itself and is occupied or is bound for the unit itself and is in the released state, and for otherwise outputting the received packet without shifting its state;

shifted packet discriminating means for discriminating whether a packet outputted from the shifting means is in the occupied, idle or released state and for generating signals indicative of said state; and controlling means responsive to said signals for causing the transmitting means to transmit an occupied packet when the packet outputted from the shifting means is either in the idle or released state and there are data to be transmitted until the number of transmitted packets reaches a selected limit assigned to the data transmission unit and, after said limit is exceeded, for causing the transmitting means to transmit an occupied packet only when the packet outputted from the shifting means is released and there are data to be transmitted, and for causing the transmitting means to transmit a released packet when the packet outputted from the shifting means is idle and there is no data to be transmitted until the number of transmitted packets reaches said limit.

18. A data transmission unit, a number of which are connected together in a ring via transmission paths to transmit data by using packets, each having a fixed length comprising:

receiving means for receiving a packet from the transmission path;

control means for controlling the receiving operation based on the contents of packets received by the receiving means;

transmitting means for transmitting a predetermined packet to the transmission path under direction of said control means;

detecting means for detecting occurrence of an error condition in the receiving means; and dummy packet generating means for generating a dummy packet when the error is detected by the detecting means and for inputting the dummy packet in place of a packet received by the receiving means to said control means; said control means further comprising:

transmitting means for inserting data into said packets and transmitting it to one of said transmission paths and for generating a released packet and transmitting said released packet onto one of said transmission paths, a released packet being one containing no user data and further containing information identifying said packet as a released packet;

transmission requirements storing means for storing a counting period over which to count the number of packets to be transmitted and a limit comprising the number of packets allowed to be transmitted in the counting period and for outputting said counting period and said limit;

transmitting packet number counting means for counting the number of packets transmitted and outputting a packet count equal to said number;

receiving means for receiving packets from one of said transmission paths and including received packet discriminating means for discriminating the state of a received packet to be either occupied, idle or released, an idle packet being one which contains no user data; and shifting means for receiving a received packet from said receiving means and outputting the received packet after shifting its state to the idle state when the received packet is bound for the unit itself and is occupied or is bound for the unit itself and is in the released state, and for otherwise outputting the received packet without shifting its state;

shifted packet discriminating means for receiving packets outputted from said shifting means for discriminating whether a packet outputted from the shifting means is in the occupied, idle or released state and for generating signals indicative of said state; and controlling means responsive to said signals and supplied with said counting period and said limit from said storing means and with said packet count for causing the transmitting means to transmit an occupied packet if the number of packets counted by the transmitted packet number counting means in said counting period is less than said limit, provided that the packet concurrently outputted from the shifting means is either in the idle state or the released state and there are data to be transmitted, for causing the transmitting means to transmit an occupied packet if the number of packets counted by the transmitting packet number counting means exceeds said limit only when the packet outputted from the shifting means is in the released state and there are data to be transmitted, and for causing the transmitting means to transmit a released packet if the number of packets counted by the transmitting packet number counting means is less than said limit when the packet outputted from the shifting means is concurrently in the idle state and there is no data to be transmitted.

19. A method of controlling data packet flow at a node in a data transmission system comprising the steps of:

designating three states for the data packets: occupied, idle, and released, and coding the data packets into three corresponding types to create an occupied packet, an idle packet, and a released packet, an idle packet being one which contains no user data, a released packet being one containing no user data and further containing an address identifying said packet as a released packet;

transmitting an occupied packet from said node at least when a packet received by said node is idle and there are data to be transmitted and continuing to transmit packets until the number of packets transmitted reaches a selected limit assigned to the node;

after said limit has been exceeded, transmitting an occupied packet from said node only when a received packet is in the released state and there are data to be transmitted; and responding to a packet received at said node which is in the idle state, and to the concurrent absence of data to be transmitted by said node, to transmit a released packet from said node.

20. The method of claim 19 wherein a released packet is transmitted on the condition that the number of transmitted packets has not reached said limit.

21. The method of claim 19 wherein said released packet is given an address indicating the node generating it.

22. The method of claim 19 wherein said data transmission system includes a plurality of nodes and wherein a released packet can be transformed into an occupied packet by any node on the ring which receives the released packet other than the node originating it.

23. The method of claim 22 wherein a node other than the originating node performs the step of occupying a released packet with data to be transmitted, thereby changing its state to occupied, even when the nonoriginating node has exceeded the limit on transmission assigned to said nonoriginating node.

* * * * *